(12) United States Patent
Hayakawa et al.

(10) Patent No.: US 6,386,064 B1
(45) Date of Patent: May 14, 2002

(54) LEATHER-WOUND STEERING WHEEL

(75) Inventors: Kenji Hayakawa, Nishikasugai-gun; Mikine Hayashi, Gifu; Atsushi Nagata, Inazawa, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 97 days.

(21) Appl. No.: 09/631,696

(22) Filed: Aug. 3, 2000

(30) Foreign Application Priority Data

Aug. 3, 1999 (JP) .......................................... 11-220360

(51) Int. Cl.[7] ................................................ B62D 1/06
(52) U.S. Cl. ...................................................... 74/558
(58) Field of Search ...................... 74/552, 558, 558.2; 16/430, 431, DIG. 2

(56) References Cited

U.S. PATENT DOCUMENTS

| | | | | |
|---|---|---|---|---|
| 3,726,152 A | * | 4/1973 | Tsuneizumi | 74/552 |
| 5,070,742 A | * | 12/1991 | Sakane et al. | 74/552 |
| 6,065,366 A | * | 5/2000 | Koyama et al. | 74/552 |
| 6,079,292 A | * | 6/2000 | Raetsen | 74/558 |
| 6,216,556 B1 | * | 4/2001 | Koyama et al. | 74/552 |

FOREIGN PATENT DOCUMENTS

| | | | | |
|---|---|---|---|---|
| JP | 61-132463 | * | 6/1986 | B62D/1/06 |
| JP | 4-163277 | * | 6/1992 | B62D/1/06 |

* cited by examiner

*Primary Examiner*—Thomas R. Hannon
*Assistant Examiner*—Timothy McAnulty
(74) *Attorney, Agent, or Firm*—Pillsbury Winthrop LLP

(57) ABSTRACT

In a leather-wound steering wheel, coating layers of synthetic resin are provided in the neighbor of a core of a ring portion which is gripped for steering. The coating layers are provided with fitting grooves provided along the sectional circumference of the ring portion. Pieces of leather covering the coating layers respectively are disposed so that their terminals provided along the sectional circumference of the ring portion are fitted into the fitting grooves in the ring portion core. Reduced portions each having a sectional outer circumference reduced toward the sectional center from general portions of the ring portion core are disposed in the regions of arrangement of the fitting grooves in the ring portion core so that the fitting grooves can be made deeper. Thus, there is provided a leather-wound steering wheel in which fitting grooves for leather terminals in a coating layer can be made deeper.

9 Claims, 9 Drawing Sheets

LEATHER-WOUND STEERING WHEEL

BACKGROUND OF THE INVENTION

1. Field of the Invention

The present invention relates to a leather-wound steering wheel for steering a vehicle and particularly to a leather-wound steering wheel which comprises a core of a ring portion gripped for steering, a coating layer disposed around the ring portion core, fitting grooves provided in the coating layer so as to be disposed along the sectional circumference of the ring portion, and leather provided for covering the coating layer and having terminals disposed along the sectional circumference of the ring portion so as to be fitted into the fitting grooves.

The present application is based on Japanese Patent Application No. Hei. 11-220360, which is incorporated herein by reference.

2. Description of the Related Art

Heretofore there is a known leather-wound steering wheel in which leather for covering a coating layer of a ring portion is disposed so that its terminals along the sectional circumference of the ring portion are fitted into fitting grooves provided in the direction of the sectional circumference of the ring portion in the coating layer (see Unexamined Japanese Patent Publication No. Hei. 10-226338).

In such a leather-wound steering wheel, external appearance of the leather was made good without worsening the curvature radius even in the case where the terminals of the leather along the sectinal circumference of the ring portion were fitted into the fitting grooves as long as the neighbor of the fitting grooves was made of a hard material such as hard synthetic resin, or the like.

However, if the fitting grooves were shallow, the terminals of the leather were apt to be separated so that the leather could not be disposed stably though the terminals of the leather were fitted into the fitting grooves. In this case, it might be conceived that the fitting grooves in the coating layer itself were made deeper. There was, however, a limitation in the attempt to make the fitting grooves in the coating layer itself deeper because the bottom portions of the fitting grooves interfered with the ring portion core.

SUMMARY OF THE INVENTION

The present invention is achieved to solve the aforementioned problem, and it is an object thereof to provide a leather-wound steering wheel in which fitting grooves for leather terminals in a coating layer can be made deeper.

In order to achieve the above object, according to an aspect of the present invention, there is provided a leather-wound steering wheel which comprises a core of a ring portion to be gripped for steering, a coating layer of synthetic resin disposed around the core of the ring portion, fitting grooves provided in the coating layer so as to be disposed along a sectional circumference of the ring portion, and leather disposed for covering the coating layer and having terminals provided along the sectional circumference of the ring portion so as to be fitted into the fitting grooves, wherein reduced portions each having a sectional outer circumference which is reduced toward a sectional center thereof from general portions of the ring portion core are disposed in regions of arrangement of the fitting grooves in the ring portion core so that the fitting grooves can be made deeper.

In the above leather-wound steering wheel, preferably, the reduced portions have taper portions for reducing the sectional outer circumference gradually from the general portions, and ribs protruding radially outward from the sectional center are formed in a direction of sectional circumference of the taper portions.

In the above leather-wound steering wheel, preferably, the ring portion core has a dented groove along a planar circumference of the ring portion.

In the leather-wound steering wheel according to the present invention, reduced portions are disposed in the regions of the fitting grooves in the ring portion core. Hence, the coating layer on the reduced portions can be made thicker. Hence, even in the case where the fitting grooves provided in the coating layer in the positions are made deeper, the bottom portions of the fitting grooves hardly interfere with the reduced portions of the ring portion core so that the fitting grooves themselves can be made deeper.

Hence, in the steering wheel according to the present invention, the fitting grooves in the coating layer can be made deeper. If the terminals of the leather are fitted into the fitting grooves, the leather terminals are fitted into the fitting grooves so deeply as not to be separated therefrom. Hence, binding strength of the leather terminals to the fitting grooves can be improved and stabilized.

If taper portions for reducing the sectional outer circumference gradually from general portions of the ring portion core are provided in the reduced portions and ribs are formed in the direction of the sectional circumference of the taper portions so as to protrude radially outward from the sectional center, the ribs can suppress molding shrinkage in the direction of the planar circumference of the ring portion in the coating layer for coating the ring portion core. Moreover, the ribs for suppressing molding shrinkage are provided not in the general portions of the ring portion core but in the taper portions. Hence, the height of each of the ribs from the sectional center of the ring portion at an end of the rib can be suppressed compared with the case where ribs each having a height allowed to suppress molding shrinkage are provided in the general portions. Hence, molding sink of the coating layer can be prevented from occurring in the regions of the ribs.

If the ring portion core is provided with a dented groove disposed along the planar circumference of the ring portion, a molding material for the coating layer flows easily into regions opposite to the fitting grooves via the dented groove along the planar circumference of the ring portion in the ring portion core even in the case where the fitting grooves are made so deeper that the bottom portions of the fitting grooves are made to abut on the ring portion core. Hence, the coating layer can be molded without any obstacle even in the case where the fitting grooves are made so deeper and deeper that the bottom portions of the fitting grooves are disposed in the ring portion core.

The above and other objects and features of the present invention will be more apparent from the following description taken in conjunction with the accompanying drawings.

DETAILED DESCRIPTION OF THE PREFERRED EMBODIMENTS

An embodiment of the present invention will be described below with reference to FIG. 1.

Figure 1:
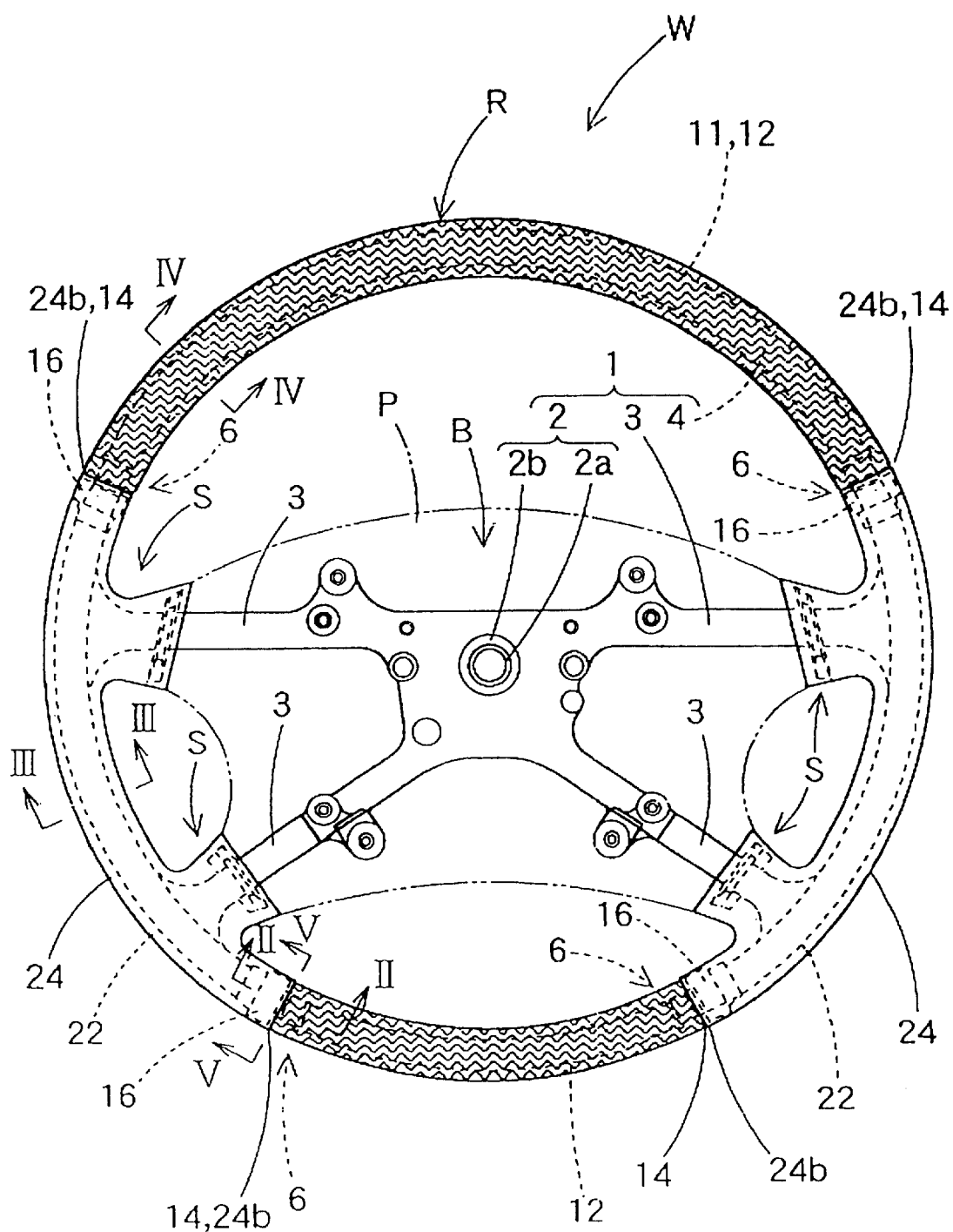
FIG. 1 is a plan view showing an embodiment of the steering wheel according to the present invention.

As shown in FIG. 1, a steering wheel W according to an embodiment of the present invention comprises a ring portion R annularly shaped so as to be gripped at steering, a boss portion B disposed in the center of the ring portion R, and four spoke portions S for connecting the ring portion R and the boss portion B to each other. A steering wheel core 1 is disposed in those portions so that those portions are connected to one another through the steering wheel core 1.

Figure 6:
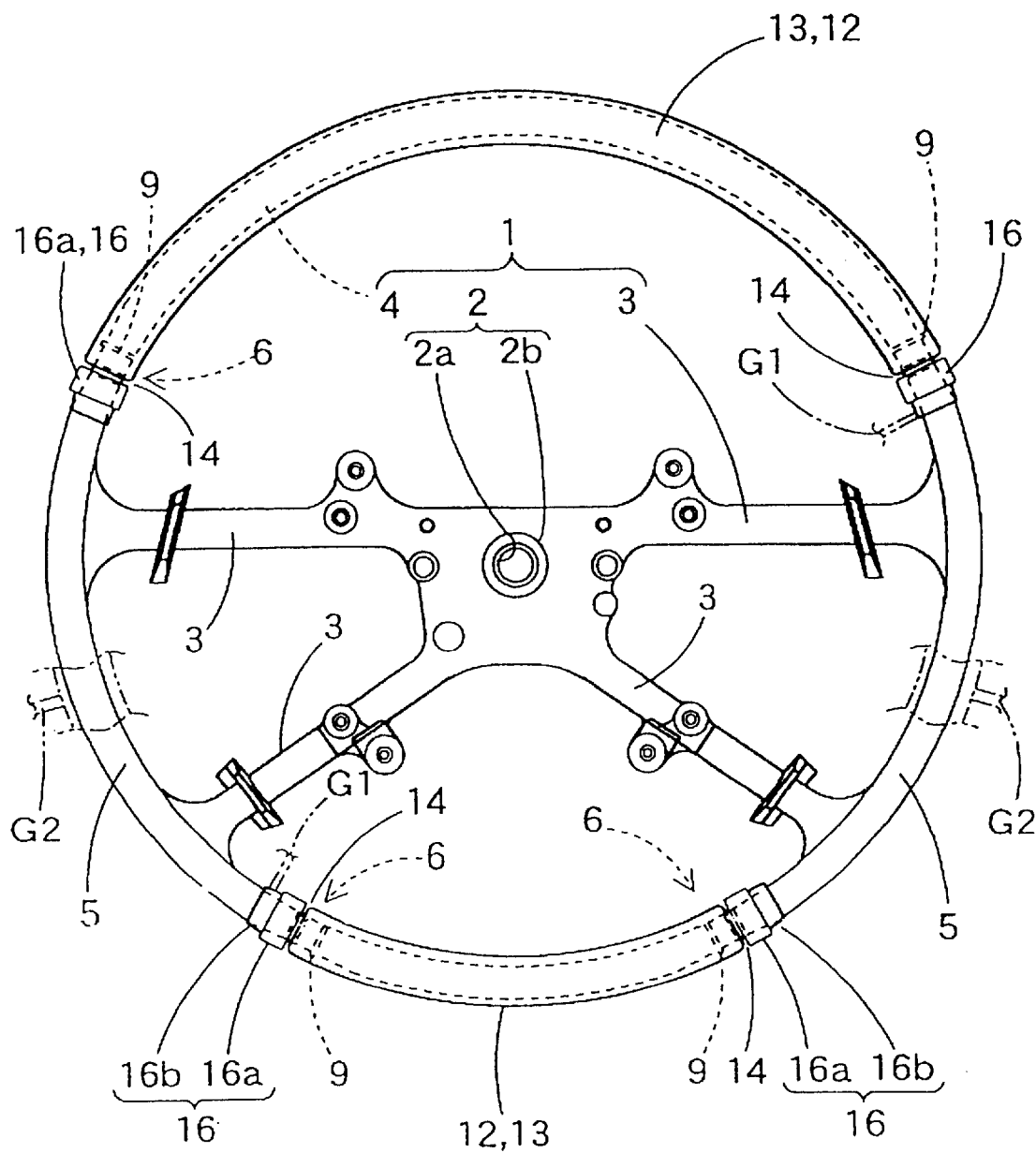
FIG. 6 is a plan view of a steering wheel core in the embodiment in the condition that a hard coating layer is molded.
Figure 7:
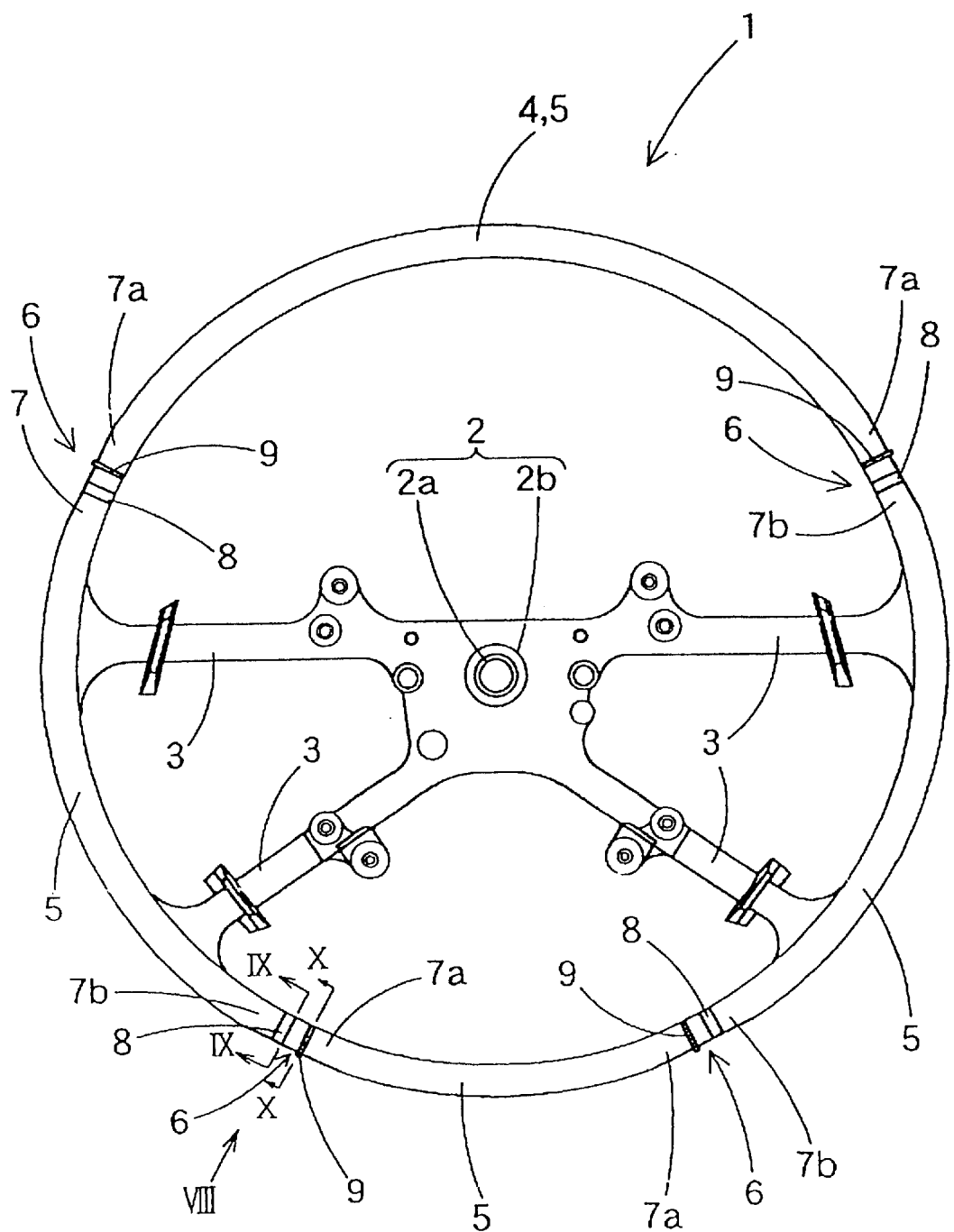
FIG. 7 is a plan view of the steering wheel core in the embodiment.

That is, as shown in FIGS. 1, 6 and 7, the steering wheel core 1 includes a boss portion core 2 disposed in the boss portion B, spoke portion cores 3 disposed in the spoke portions S respectively, and a ring portion core 4 disposed in the ring portion R. In the steering wheel core 1, a boss 2a formed in the center of the boss portion core 2 so as to be connected to a steering shaft is made of steel. The other portions of the steering wheel core 1, that is, a boss coating portion 2b formed in the boss portion core 2 so as to be disposed around the boss 2a, the spoke portion cores 3 and the ring portion core 4 are made of diecast metal formed by die-casting.

Incidentally, in this embodiment, the diecast metal forming the boss coating portion 2b, the spoke portion cores 3 and the ring portion core 4 is formed of a light alloy such as a magnesium alloy, an aluminum alloy, or the like.

Figure 11:
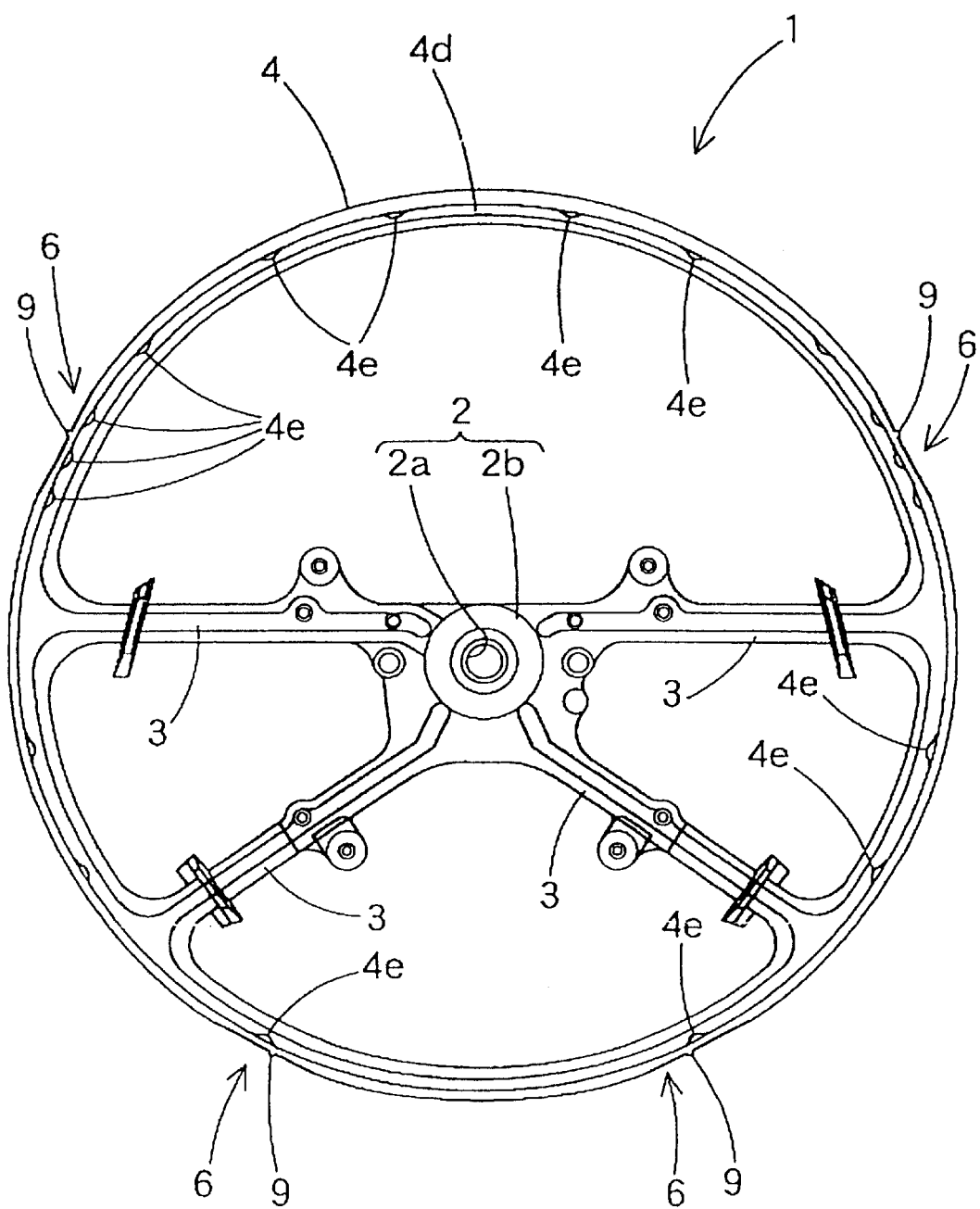
FIG. 11 is a bottom view of the steering wheel core in the embodiment.

As shown in FIGS. 3 to 5 and FIGS. 9 and 10, the ring portion core 4 has an outer circumferential wall portion 4a, an inner circumferential wall portion 4b, and a connection wall portion 4c for connecting the outer and inner circumferential wall portions 4a and 4b to each other on the upper end side. The ring portion core 4 is shaped like an inverted "U" figure in sectional view so as to be opened downward. Hence, the ring portion core 4 is provided with a dented groove 4d formed along a planar circumference of the ring portion R. The height of the outer circumferential wall portion 4a is set to be smaller than the height of the inner circumferential wall portion 4b. A plurality of ribs 4e are provided, as shown in FIG. 11, so as to protrude from an inner side surface of the outer circumferential wall portion 4a. The ribs 4e serve to prevent a coating layer 11 (hard coating layers 12 and soft coating layers 22) from suffering molding shrinkage in the direction of the planar circumference of the ring portion. The coating portion 11 will be described later.

Incidentally, the vertical or up/down direction in the steering wheel W means the vertical or up/down direction along the steering shaft connected to the boss 2a of the boss portion B.

As shown in FIGS. 1 and 2 and FIGS. 7 to 9, four reduced portions 6 are disposed in the ring portion core 4. Each of the reduced portions 6 has a sectional outer circumference which is reduced toward the sectional center C so as to be smaller than those of general portions 5 of the ring portion core 4. The reduced portions 6 are disposed in the regions of fitting grooves 14 provided in hard coating layers 12 which will be described later. Incidentally, the general portions 5 means the other portions of the ring portion core 4 than the reduced portions 6.

Figure 8:
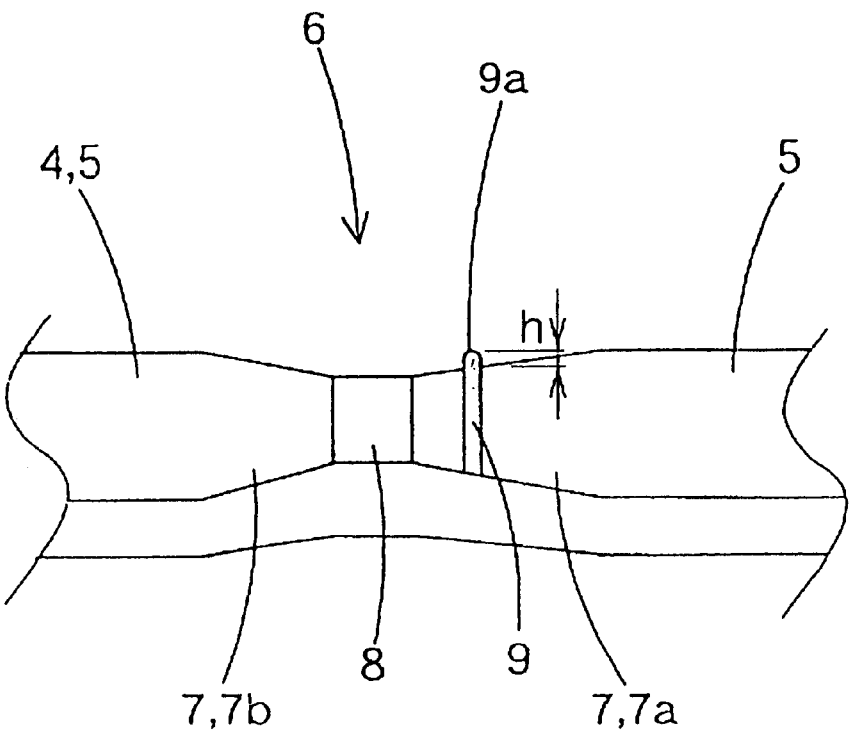
FIG. 8 is a side view of the steering wheel core from the view point VIII in FIG. 7.
Figure 9:
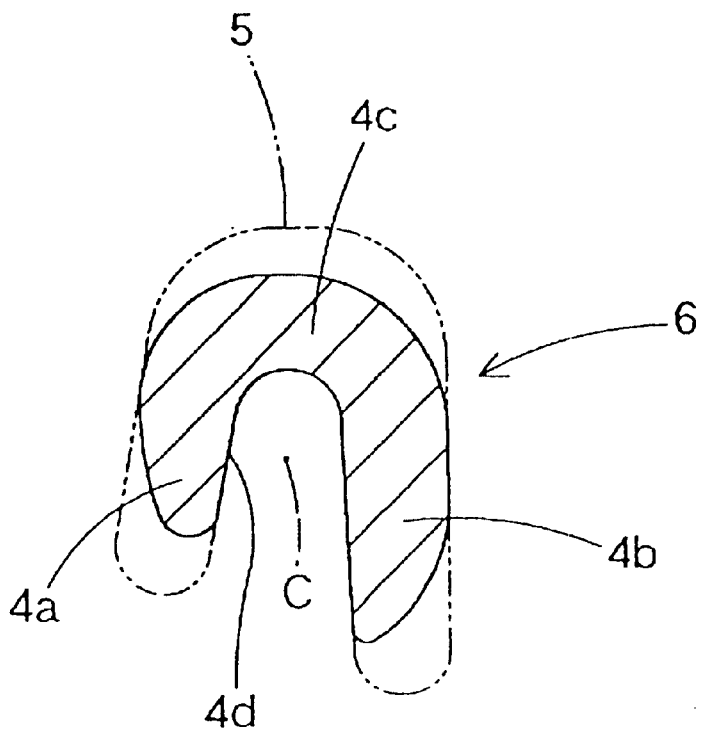
FIG. 9 is an enlarged sectional view taken along the line IX—IX in FIG. 7.
Figure 10:
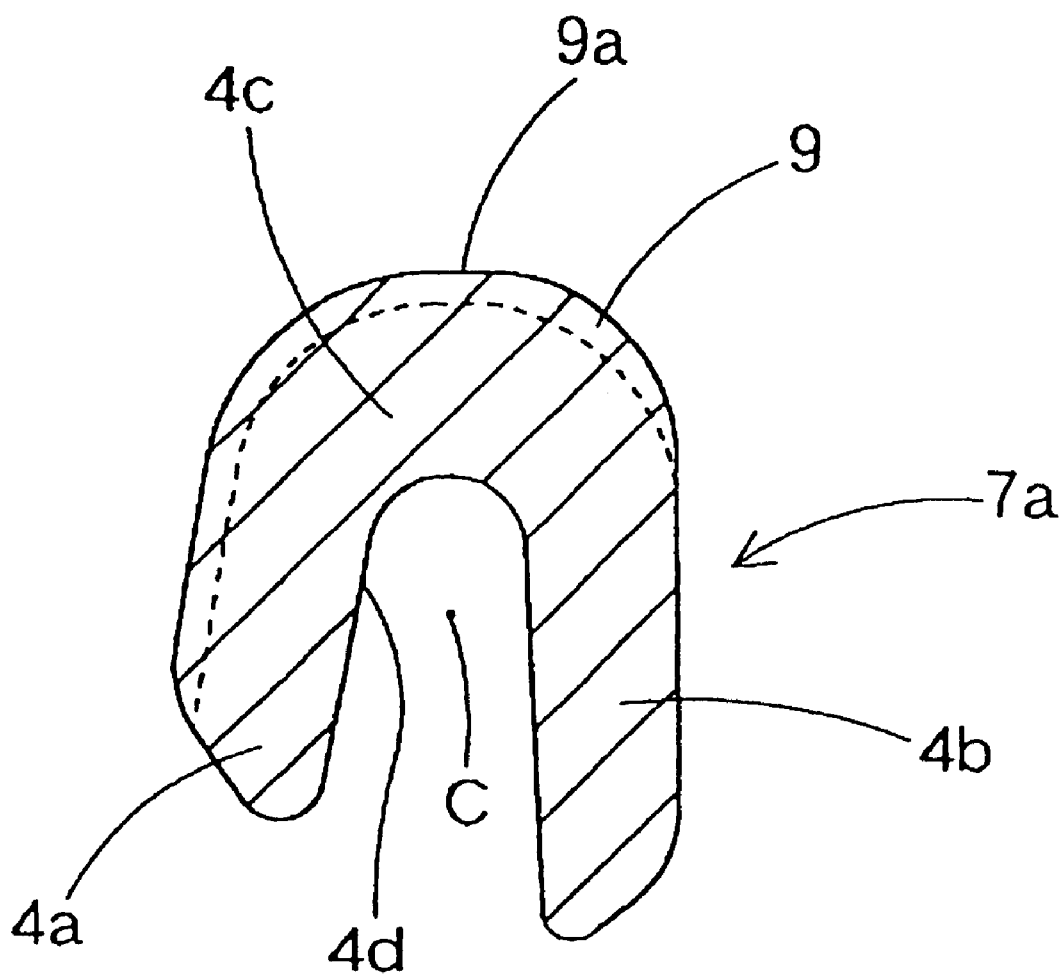
FIG. 10 is an enlarged sectional view taken along the line X—X in FIG. 7.

Each of the reduced portions 6 has a pair of taper portions 7 and 7 (7a and 7b) for reducing the sectional outer circumference gradually from opposite-side general portions 5 and 5 along the planar circumference of the ring portion R, and a bottom portion 8 disposed between the pair of taper portions 7 and 7 (7a and 7b) and reduced most to keep the sectional shape constant. The fitting grooves 14 which will be described later are disposed in the positions of the bottom portions 8 respectively. As shown in FIGS. 7 to 9, each of the reduced portions 6 is reduced toward the sectional center C. That is, the connection wall portion 4c is made so thinner as to be dented downward. Moreover, the height of the inner circumferential wall portion 4b is made so smaller that the lower end of the inner circumferential wall portion 4b is dented upward. Moreover, the outer circumferential wall portion 4a is dented so that its lower end extending obliquely downward outward is reduced upward.

As shown in FIGS. 2, 7, 8 and 10, ribs 9 protruding radially outward from the sectional center C are formed on the sectional circumference of the taper portions 7a of the hard coating layers 12 on the body portion 13 side, which will be described later, among the taper portions 7 of the reduced portions 6. The ribs 9 are formed on the outer circumference of the outer circumferential wall portions 4a and the connection wall portions 4c. The height of each of the ribs 9 is set to be approximately equal to the height of the line of extension of the general portion 5. In this embodiment, the protrusion height h (see FIG. 8) of each of the ribs 9 is set to be 1 mm.

As shown in FIGS. 1 to 5, in the ring portion R, the circumference of the ring portion core 4 is coated with a coating layer 11 of synthetic resin. The coating layer 11 is formed so that two hard coating layers 12 of hard synthetic resin and two soft coating layers 22 of soft synthetic resin softer than the hard coating layers 12 are disposed alternately along the planar circumference of the ring portion R.

In this embodiment, the hard coating layers 12 are disposed before and behind the ring portion R at straight steering of the vehicle whereas the soft coating layers 22 are disposed on both left and right sides of the ring portion R at straight steering of the vehicle so as to extend to the ring portion R side regions of two pairs of spoke portions S on the left and right sides.

Figure 2:
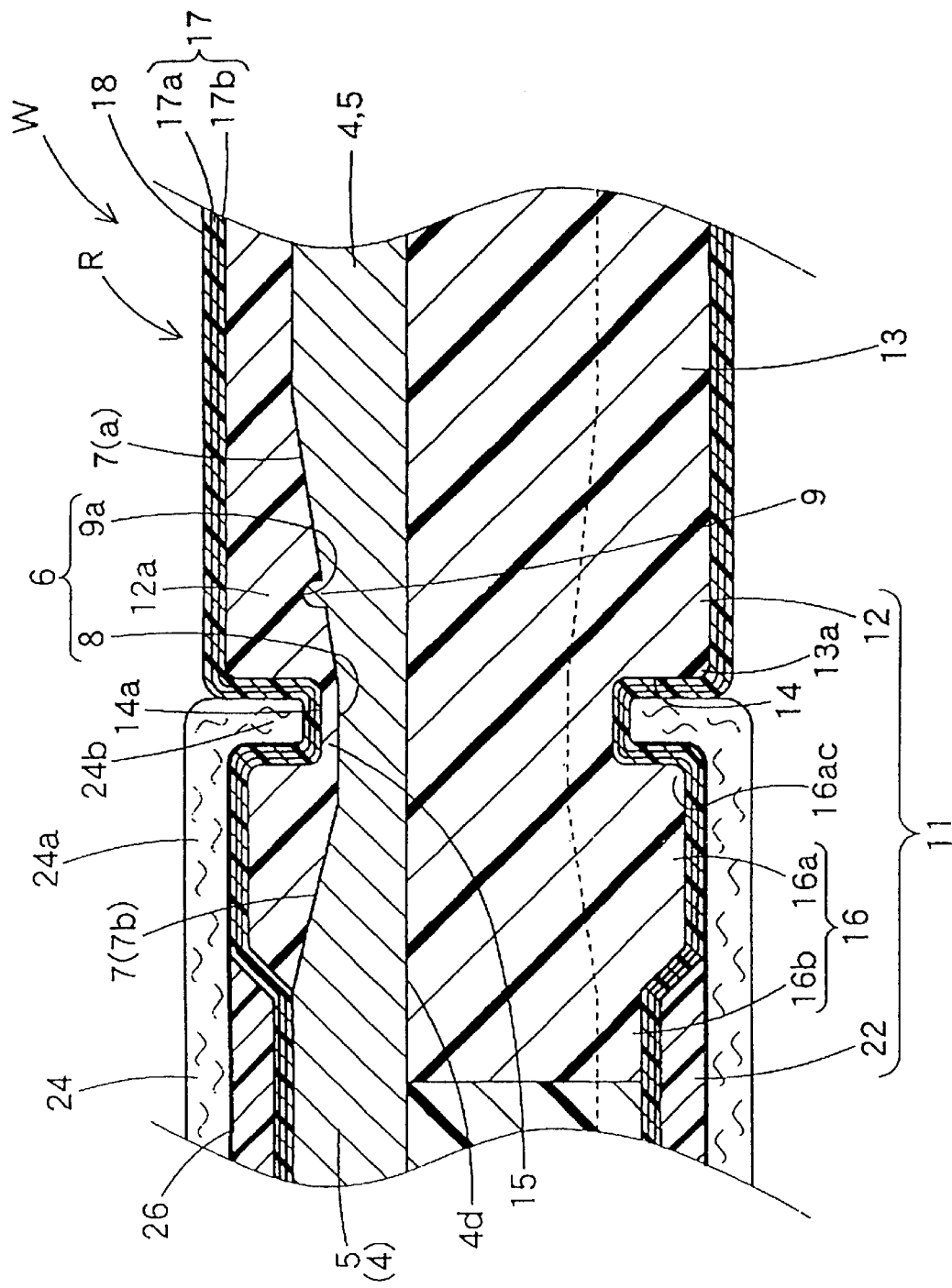
FIG. 2 is an enlarged sectional view taken along the line II—II in FIG. 1.
Figure 3:
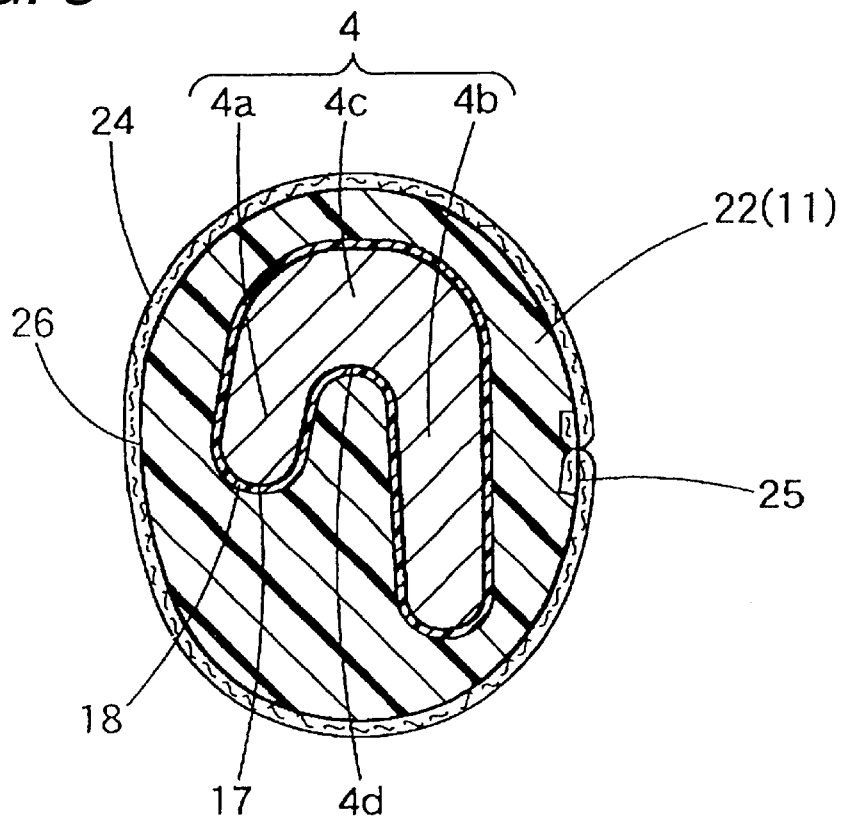
FIG. 3 is an enlarged sectional view taken along the line III—III in FIG. 1.
Figure 4:
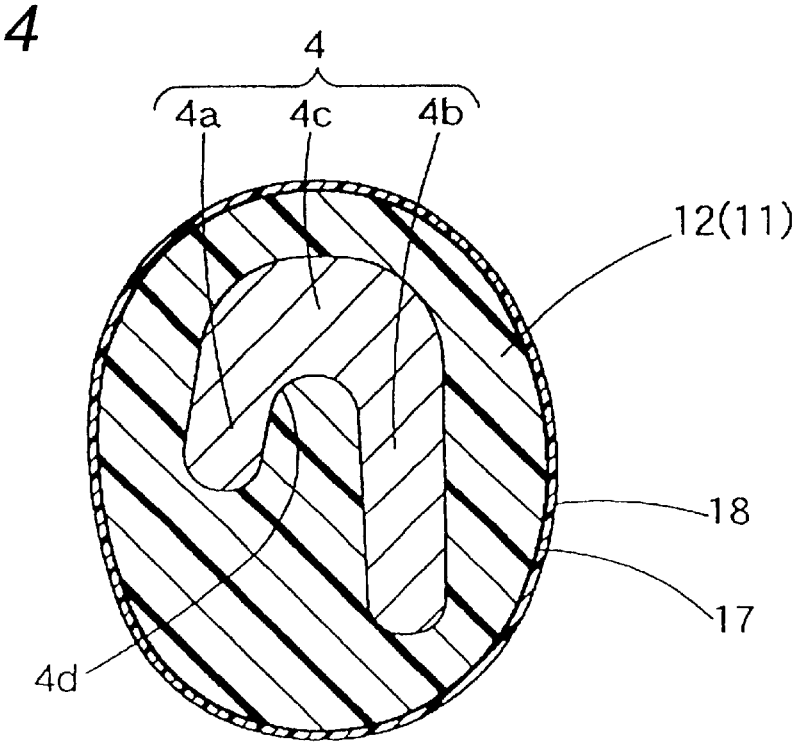
FIG. 4 is an enlarged sectional view taken along the line IV—IV in FIG. 1.
Figure 5:
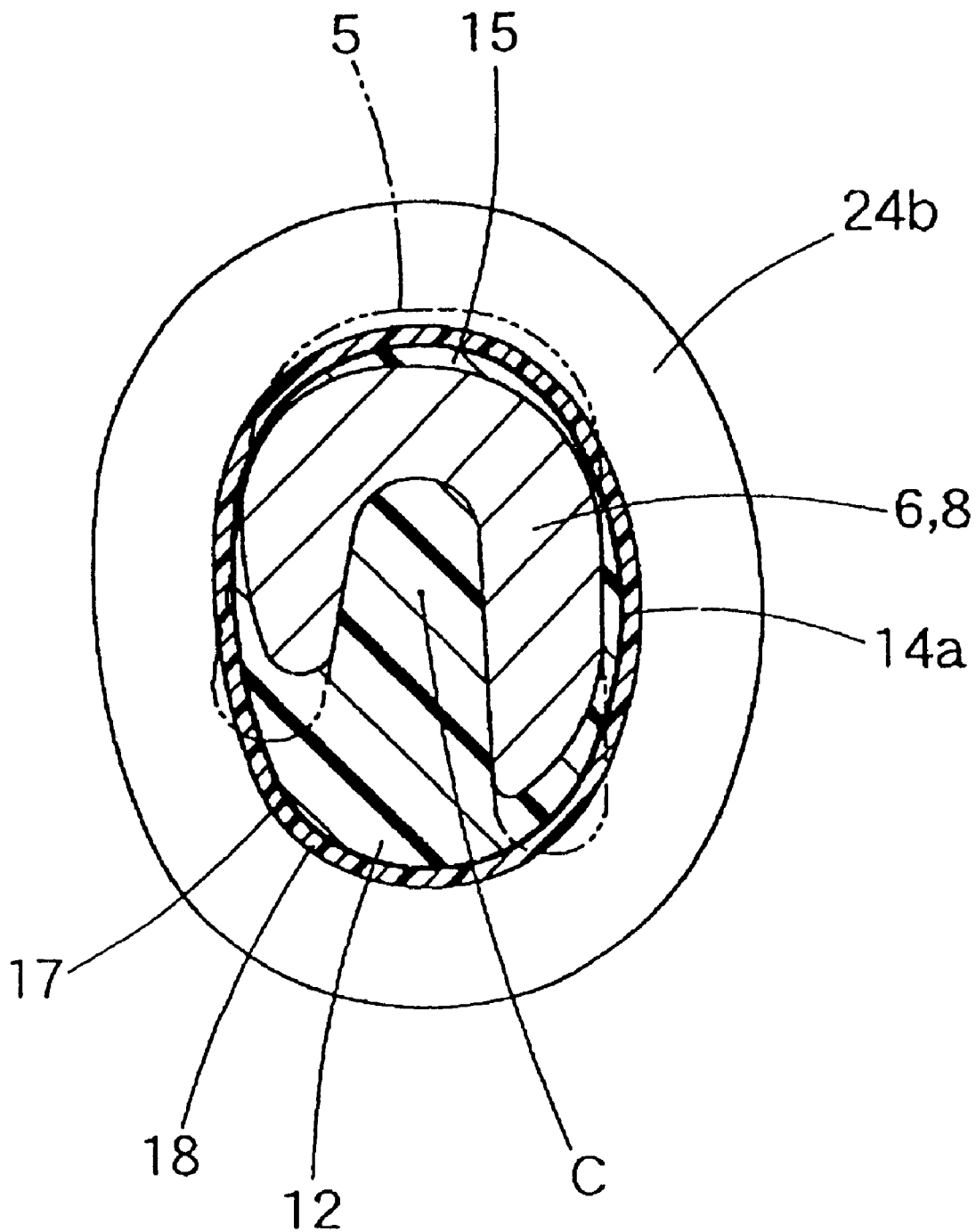
FIG. 5 is an enlarged sectional view taken along the line V—V in FIG. 1.

A pattern decorating layer 17 printed by hydraulic decalcomania transferring is formed on the surface of the body portion 13 of each of the hard coating layers 12 and 12. The body portion 13 will be described later. As shown in FIGS. 1 to 3, leather 24 is bonded onto the surfaces of the soft coating layers 22 by an adhesive agent 26 and stitched together in the inside of the boss portion B of the ring portion R by use of sewing yarn 25.

Incidentally, in this embodiment, each of the hard coating layers 12 is made of polypropylene whereas each of the soft coating layers 22 is made of soft polyurethane.

As shown in FIGS. 1, 2 and 6, fitting grooves 14 are disposed at respective ends of the hard coating layers 12 viewed in the direction of the sectional circumference of the ring portion R so that the fitting grooves 14 are formed on the whole circumference along the sectional circumference of the ring portion R. Support portions 16 for supporting end portions 24a of the leather 24 are further formed at the respective ends of the hard coating layers 12. Each of the support portions 16 is substantially shaped like a column and has a support surface portion 16a, and a protrusive portion 16b. The support surface portion 16a is made to abut on the rear surface of the leather 24 to support the leather end portion 24a. The protrusive portion 16b has its outer diameter reduced to be far from the inner circumference of the leather 24 at the end of the support surface portion 16a and protrudes toward the inner circumference of the soft coating layer 22.

In this embodiment, the reduced portions 6 of the ring portion core 4 are coated with the hard coating layers 12 so that the thickness of the reduced portions 6 from the outer circumference is made thicker. Moreover, the bottom portions 14a of the fitting grooves 14 are made to reach the neighbor of the outer circumference of the reduced portions 6 of the core 4 so that the fitting grooves 14 are disposed slightly deeper than the height of the outer circumference of the general portions 5. As a result, each of the fitting grooves 14 is made deep compared with the case where no reduced portion 6 is provided.

Incidentally, the region between adjacent fitting grooves 14 and 14 in each of the hard coating layer 12 serves as a body portion 13 of the hard coating layer 12. As shown in FIG. 2, each of a fitting groove 14 side corner portion 13a of the body portion 13 and a fitting groove 14 side corner portion 16ac of the support surface portion 16a is shaped like a circular arc surface with a curvature radius of 0.4R or more so as not to serve as a sharp edge. Hence, a hydraulic decalcomania transfer printed layer 17a is prevented from breaking at each corner portion 13a or 16ac at hydraulic decalcomania transferring to cause a transfer-disabled state. The printed layer 17a will be described later.

As shown in FIG. 2, the decorating layer 17 provided on the outer circumference of the body portion 13 of each hard coating layer 12 is constituted by the printed layer 17a of a woodgrain pattern. The printed layer 17a is provided by hydraulic decalcomania transferring and has a thickness set to be in a range of from 1 to 3 $\mu$m. A primer layer 17b made of chlorinated polypropylene, or the like, is provided on the rear side of the printed layer 17a in order to make the adhesion between the printed layer 17a and the body portion 13 good.

A coating layer 18 which is transparent and which has a thickness set to be in a range of from 10 to 40 $\mu$m to protect the printed layer 17a is formed on the outer circumference of the decorating layer 17. As shown in FIGS. 2 and 3, the coating layer 18 and the decorating layer 17 are formed to extend not only to the surface of the body portion 13 but also to the inner circumference of the fitting groove 14 and further to the outer circumference of the support portion 16 inclusive of the protrusive portion 16b. In this embodiment, the coating layer 18 and the decorating layer 17 further extend to the end surface of the support portion 16 and to the outer circumference of the general portion 5 of the ring portion core 4.

In this embodiment, the coating layer 18 is made of polyurethane to secure good adhesion between the leather 24 and the soft coating layer 22 of soft polyurethane.

The production of the steering wheel W in this embodiment will be described below. A steering wheel core 1 is produced in advance. The steering wheel core 1 is produced by die-casting in the condition that a boss 2a is set in a predetermined die-casting mold. As shown in FIG. 7, four reduced portions 6 having ribs 9 are provided in a ring portion core 4 on this occasion.

Then, the steering wheel core 1 is set in a mold for molding hard coating layers 12 and 12. After mold clamping, a molding material for the hard coating layers 12 is injected into the mold. Thus, as shown in FIG. 6, hard coating layers 12 and 12 each having a body portion 13, fitting grooves 14 and support portions 16 are molded.

Incidentally, a gate G1 for injecting the molding material for the hard coating layers 12 and 12 is disposed in an inner region of one support portion 16 as represented by the two-dot chain line in FIG. 6.

After molding, molding shrinkage of the hard coating layers 12 and 12 in the direction of the planar circumference of the ring portion R is suppressed by the ribs 9 of the reduced portions 6 even in the case where there is a condition that molding shrinkage may be generated. Moreover, in this embodiment, the plurality of ribs 4e are provided on the inner circumference of the dented grooves 4d of the ring portion core 4. Hence, molding shrinkage in the direction of the planar circumference of the ring portion R is suppressed also by the ribs 4e.

After the hard coating layers 12 and 12 are molded, the steering wheel core 1 is released from the mold. Then, after the boss portion core 2 of the steering wheel core 1 is masked, a primer layer 17b is applied onto the outer circumference of the hard coating layers 12 and 12 and the ring portion core 4 except the boss portion core 2. After the primer layer 17b is provided in the aforementioned manner, the printed layer 17a is formed by hydraulic decalcomania transferring. Then, the coating layer 18 is formed by application onto the outer circumference of the printed layer 17a.

Then, the mask material is removed and the steering wheel core 1 provided with the hard coating layers 12 and 12 is set in a mold for molding the soft coating layers 22 and 22. After mold clamping, a molding material for the soft coating layers 22 and 22 is injected into the mold. Thus, the soft coating layers 22 and 22 are molded.

Incidentally, gates G2 for injecting the molding material for the soft coating layers 22 and 22 are disposed in the outer regions of the soft coating layers 22 as represented by the two-dot chain line in FIG. 6.

The molding surface of the mold for molding the soft coating layers 22 and 22 comes into forced contact with the outer circumference of support surface portions 16a in the support portions 16 of the hard coating body portions 13 when the mold is clamped.

After molding, molding shrinkage of the soft coating layers 22 and 22 in the direction of the planar circumference of the ring portion R is suppressed by the plurality of ribs 4e provided on the inner circumference of the dented grooves 4d of the ring portion core 4 even in the case where there is a condition that molding shrinkage may be generated.

After the soft coating layers 22 and 22 are molded, the steering wheel core 1 is released from the mold. A chloroprene rubber type adhesive agent 26 is applied onto the neighbor of the soft coating layers 22 and 22 and the support portions 16, so that the leather 24 is stitched together and disposed. On this occasion, while the end portions 24a of the leather 24 are made to abut on the outer circumference of the supper surface portions 16a in the support portions 16 of the hard coating body portions 13 through the adhesive agent 26, terminals 24b of the leather 24 are fitted into the fitting grooves 14 provided in the hard coating layer body portions 13. Then, sewing yarn 25 is used so that pieces of leather 24 and 24 are disposed from the outer circumference of the soft coating layers 22 to the regions of the fitting grooves 14 of the hard coating layers 12 and 12.

If a lower cover or a pad P not shown is further attached to the lower or upper portion of the boss portion B, the production of the steering wheel W is completed so that the steering wheel W can be used after mounted into a vehicle. Incidentally, because the steering wheel W is fastened to the steering shaft by nuts when mounted into the vehicle, the pad P must be attached to the steering wheel W after the steering wheel W is mounted into the vehicle in the condition that the pad P is removed.

In the steering wheel W according to the aforementioned embodiment, the reduced portions 6 are disposed in the regions of arrangement of the fitting grooves 14 in the ring portion core 4. The hard coating layers 12 on the reduced portions 6 can be formed to be thicker. As a result, even in the case where the fitting grooves 14 provided in the coating layers 12 located in the positions are made deeper, the bottom portions 14a of the fitting grooves 14 hardly interfere with the reduced portions 6 of the ring portion core 4. Hence, the fitting grooves 14 themselves can be formed to be deeper.

Hence, in the steering wheel W according to this embodiment, the fitting grooves 14 of the hard coating layers 12 can be made deeper. If the terminals 24b of the leather 24 are fitted into the fitting grooves 14, the leather terminals 24b are fitted into the fitting grooves 14 so deeply as not to be separated therefrom. Hence, the binding strength of the terminals 24b to the fitting grooves 14 can be improved and stabilized.

Further, in this embodiment, the taper portions 7a and 7b for reducing the sectional outer circumference gradually from the general portions 5 of the ring portion core 4 are provided in the reduced portions 6. The ribs 9 protruding radially outward from the sectional center C are provided in the direction of the sectional circumference of the taper portions 7a on the body portion 13 of the hard coating layers 12. Hence, the ribs 9 can suppress molding shrinkage of the hard coating layers 12 with which the ring portion core 4 is coated. The ribs 9 for suppressing molding shrinkage are provided not in the general portions 5 of the ring portion core 4 but in the taper portions 7a reduced toward the sectional center C to be smaller than the general portions 5. Hence, cover portions 12a of the hard coating layers 12 with which the ribs 9 are covered are not made thinner. Hence, molding sink can be prevented from occurring in the cover portions 12a. Incidentally, if the ribs 9 are provided on the outer circumference of the general portions 5, the cover portions 12a of the hard coating layers 12 with which the ribs 9 are covered become thinner. As a result, resin regions on both sides in the direction of the planar circumference of the ring portion R in the cover portions 12a suffer molding shrinkage, so that molding sink occurs in the cover portions 12a. If molding sink occurs in the cover portions 12a, the printed layer 17a cannot be completed precisely so that failure in external appearance occurs.

If the reduced portions 6 have the taper portions 7a and 7b for reducing the sectional outer circumference gradually from the general portions 5 of the ring portion core 4, stress concentration hardly occurs. Hence, there is no risk of reduction of strength against load vertically acting on the ring portion core 4.

Further, in this embodiment, the ring portion core 4 is shaped like an inverted "U" figure in sectional view to form the dented groove 4d along the planar circumference. Hence, even in the case where the fitting grooves 14 are made so deeper that the bottom portions 14a of the fitting grooves 14 are made to abut on the bottom portions 8 of the reduced portions 6 in the ring portion core 4, that is, even in the case where the thickness of the connection bottom portions 15 (see FIG. 2) of the fitting groove bottom portions 14a is set to zero, the molding material for the hard coating layers 12 can flow easily to the body portions 13, etc. opposite to the fitting grooves 14 via the dented groove 4d along the planar circumference of the ring portion R in the ring portion core 4. Hence, even in the case where the fitting grooves 14 are made deeper so that the bottom portions 14a of the fitting grooves 14 are disposed to abut on the bottom portions 8 of the ring portion core 4, the hard coating layers 12 can be molded without any obstacle.

Although this embodiment has shown the case where the ring portion core 4 is shaped like an inverted "U" figure in sectional view, the present invention may be applied also to the case where the ring portion core is shaped like an "H" figure in sectional view as long as a dented groove can be formed in the direction of the planar circumference of the ring portion R.

Although this embodiment has shown the case where the soft coating layers 22 for making the touch of the leather 24 good are disposed on the rear surface side of the leather 24 except the regions of the hard coating layers 12 for preventing the curvature radius in the neighbor of the end portions 24a from getting wrong, the present invention may be applied also to the case where the regions of the soft coating layers 22 are replaced by the hard coating layers 12. In this case, a cushion sheet, or the like, may be disposed separately on the rear surface side of the leather 24.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A leather-wound steering wheel comprising:
    a core of a ring portion gripped for steering;
    a coating layer of synthetic resin disposed around said core of said ring portion;
    a fitting groove provided in said coating layer so as to be disposed along a sectional circumference of said ring portion;
    a leather disposed for covering said coating layer and having a terminal provided along a sectional circumference of said ring portion so as to be fitted into said fitting grooves; and a reduced portion provided in a region of said core so as to correspond to an arrangement position of said fitting groove of said coating layer, said reduced portion having a sectional outer circumference which is reduced toward a sectional center of said core from a general portion of said core so that said fitting grooves can be made deeper.

2. A leather-wound steering wheel according to claim 1, wherein said reduced portion comprises:
    a taper portion for reducing said sectional outer circumference gradually from said general portion of said core; and
    a first rib protruding radially outward from said sectional center and being formed in a direction of the sectional circumference of said taper portion.

3. A leather-wound steering wheel according to claim 1, wherein said core has a dented groove along a planar circumference of said ring portion.

4. A leather-wound steering wheel according to claim 3, wherein a plurality of second ribs are formed on said core so as to protrude in said dented groove along the planar circumference of said ring portion.

5. A leather-wound steering wheel according to claim 1, wherein said reduced portion comprises:
   a pair of taper portions for reducing the sectional outer circumference gradually from said general portion of said core along the planar circumference of said ring portion; and
   a bottom portion disposed between the pair of taper portions and retaining a sectional shape of said core at constant.

6. A leather-wound steering wheel according to claim 5, wherein said reduced portion further comprises a first rib formed along a sectional circumference of said taper portion and protruding radially outward from said taper portion.

7. A leather-wound steering wheel according to claim 6, wherein a height dimension of said first rib is set to be approximately equal to a height of a line of extension of the general portion of said core.

8. A leather-wound steering wheel according to claim 1, wherein said core has an inverted U-shape cross section, and said core comprises an outer circumferential wall portion, an inner circumferential wall portion, and a connection wall portion for connecting said outer and inner circumferential wall portions, each of said outer and inner circumferential wall portions and said connection wall portion being extended in the planar circumference of said ring portion, and
   wherein said reduced portion is formed so that said connection wall portion is made so thinner than that of the general portion of said core, and a height dimension of each of said outer and inner circumferential wall portions are made smaller than that of the general portion.

9. A leather-wound steering wheel according to claim 8, wherein a plurality of second ribs are formed so as to protrude from an inner side surface of said outer circumferential wall portion.

\* \* \* \* \*